United States Patent [19]
Matsuba et al.

[11] Patent Number: 5,929,205
[45] Date of Patent: Jul. 27, 1999

[54] METHOD OF CONTINUOUSLY DISSOLVING RUBBER

[75] Inventors: Kenichiro Matsuba; Katsuhisa Arai, both of Chiba; Tetsuo Maeda, Urayasu, all of Japan

[73] Assignee: Toyo Engineering Corporation, Tokyo, Japan

[21] Appl. No.: 09/056,657

[22] Filed: Apr. 7, 1998

[30] Foreign Application Priority Data

Apr. 8, 1997 [JP] Japan ............................. 122758/1997

[51] Int. Cl.$^6$ ................. C08J 3/11; C08F 6/06; C08G 63/91
[52] U.S. Cl. .................. 528/498; 528/491; 528/492; 528/497; 525/52; 525/53
[58] Field of Search .................... 528/491, 492, 528/497, 498; 525/52, 53

[56] References Cited

U.S. PATENT DOCUMENTS

| | | | |
|---|---|---|---|
| 3,903,040 | 9/1975 | Politte | 525/53 |
| 4,419,488 | 12/1983 | Fukumoto et al. | 525/53 |

FOREIGN PATENT DOCUMENTS

| | | |
|---|---|---|
| 4-130 111 | 1/1992 | Japan . |
| 4-130111 | 5/1992 | Japan . |
| 379 311 | 8/1932 | United Kingdom . |
| 2 201 355 | 9/1988 | United Kingdom . |

*Primary Examiner*—Peter A. Szekely
*Attorney, Agent, or Firm*—Flynn, Thiel, Boutell & Tanis, P.C.

[57] ABSTRACT

A method of dissolving a rubber continuously to form a raw material for the production of rubber-modified polymer, by dissolving a rubber in a monomer liquid dissolving the rubber and capable of reacting with the rubber in the presence or absence of a solvent. Pieces of rubber are fed continuously to a dissolution tank to allow the dissolved rubber and the undissolved rubber to coexist in the dissolution tank, wherein the concentration of the dissolved rubber is the concentration at which the feeding to the reactor is made, and the quantity of the undissolved rubber present in the dissolution tank is at most the quantity that prevents pieces of the undissolved rubber from sticking to one another to form larger rubber masses. The time required for dissolution can be shortened, and the size of a dissolution tank can be made smaller, compared with the conventional methods.

5 Claims, 4 Drawing Sheets

METHOD OF CONTINUOUSLY DISSOLVING RUBBER

FIELD OF THE INVENTION

The present invention relates to a method for continuously dissolving a rubber, and more particularly to a method for continuously dissolving a rubber in the presence of a monomer liquid or both a monomer liquid and a solvent by supplying continuously the rubber to a dissolution tank in the production of a rubber-modified resin.

BACKGROUND OF THE INVENTION

In producing a rubber-modified polymer, conventionally, as a raw material, a rubber dissolved, for example, in styrene, in the case of the production of an impact-resistant polystyrene, or in styrene and acrylonitrile, in the case of the production of an ABS resin, in the presence or absence of a solvent, such as benzene, ethylbenzene, toluene, and xylene, is fed to a reactor.

Conventionally, to dissolve a rubber in the above liquid, a predetermined quantity of the rubber and the above liquid that would attain a desired concentration of the rubber, was fed to a dissolution tank, and the rubber was dissolved completely in the liquid in the tank. Generally, as one method for dissolving a rubber completely, a method was employed wherein a rubber was dissolved in a rubber dissolution tank batch-wise.

As a further method proposed, a method disclosed in JP-A-4-130111 ("JP-A" means unexamined published Japanese patent application) can be mentioned. In the method disclosed in this application, a wet grinding apparatus was positioned between two rubber dissolution tanks, to make a rubber readily dissolved.

The concept of the dissolution rate of a rubber in the above prior art dissolution method is illustrated by the curve b in FIG. 2. As is shown by the curve b, in these methods, the rate at which a rubber is dissolved in a monomer liquid or a solvent gradually decreases as the amount of undissolved rubber decreases according to increase of concentration of the rubber in the rubber solution by the dissolution of the rubber. Therefore it requires a considerable period of time for a rubber to be dissolved completely. Accordingly, the volume of the dissolution tank was large.

Therefore, the prior techniques were accompanied by the following problems to be solved:

(1) In the method wherein a rubber is dissolved in a rubber dissolution tank batch-wise, the dissolution tank is large and the dissolution efficiency of a rubber is not good.

(2) In the method disclosed in JP-A-4-130111 in which two dissolution tanks are required, although the dissolution tank in the first half can be made smaller than the dissolution tank described in the above (1), the dissolution efficiency of rubber is not good in the second dissolution tank in the second half. Though the dissolution by the second dissolution tank is improved a little in dissolution rate, it is same as batch-wise dissolving in which the rubber is to be dissolved completely. Specifically, the concentration of a rubber in the second dissolution tank is required to be the concentration of the raw material for producing rubber-modified polymer with the rubber being dissolved and undissolved in a styrene-type monomer and a solvent including an undissolved rubber. Thus, along with rise of rubber concentration, the dissolving velocity of rubber becomes slow due to decrease of the undissolved rubber. As a result thereof, it is required to allow a longer residence time, so as to allow a small quantity of an undissolved rubber to be dissolved, and therefore the volumetric efficiency of the dissolution tank becomes poor and therefore it is difficult to make the total volume of the first and second dissolution tanks extremely small. Further, consequently, when the rubber concentration desired is varied during continuous operation, it takes a longer time for the final dissolution tank to reach the desired rubber concentration.

BRIEF SUMMARY OF THE INVENTION

An object of the present invention is to provide a method for continuously dissolving a rubber that can make the size of a dissolution tank small by dissolving continuously the rubber efficiently.

Other objects and advantages of the invention will become apparent from the following description taken in connection with the accompanying drawings.

DETAILED DESCRIPTION OF THE INVENTION

Figure 1:
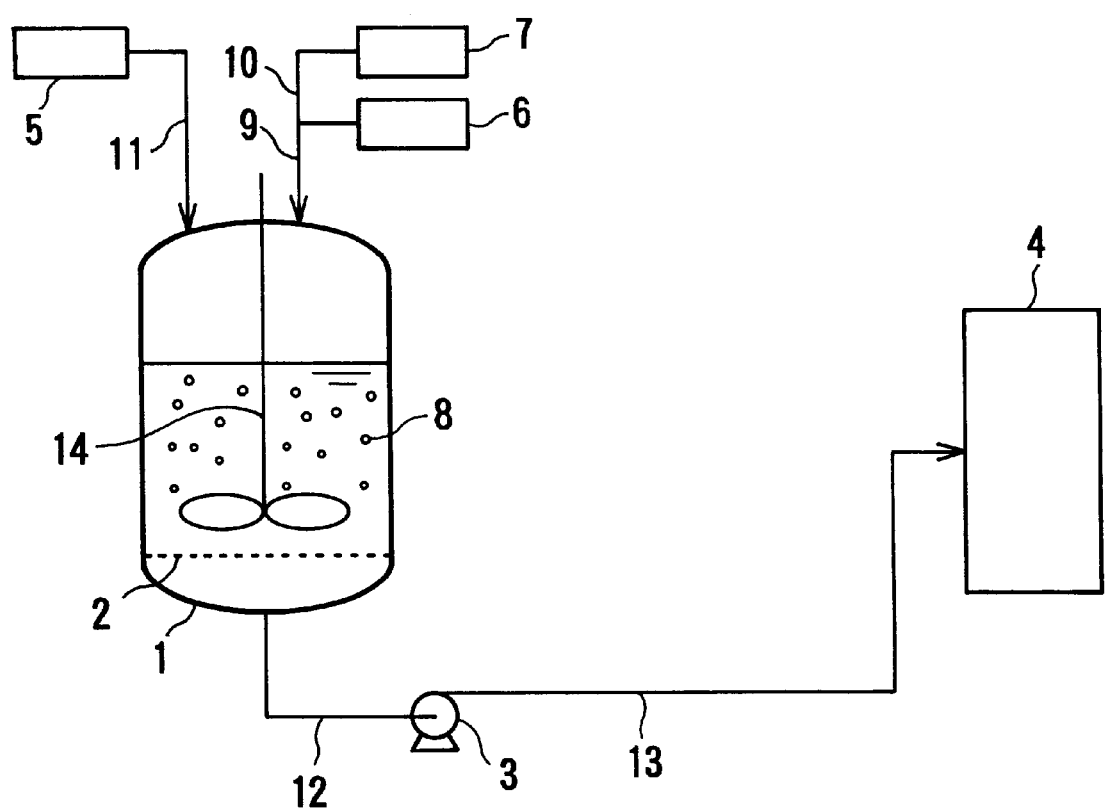
FIG. 1 is an illustrative diagram showing an embodiment of the present invention.

Taking the above circumstances into account, the object of the present invention has been attained by the following dissolution method.

That is, there is provided a method for dissolving a rubber continuously to form a raw material, by dissolving a rubber in a monomer liquid which dissolves the rubber and is capable of reacting with the rubber, in the presence or absence of a solvent, that is supplied continuously from a dissolution tank into a reactor for the production of a rubber-modified polymer, which comprises feeding a solid rubber to the dissolution tank continuously to allow the dissolved rubber and the undissolved rubber to coexist in the dissolution tank, wherein the concentration of the dissolved rubber is the concentration at which the feeding to the reactor is made, and the quantity of the undissolved rubber present in the dissolution tank is at most the quantity that prevents pieces of the undissolved rubber from sticking to one another to form larger rubber masses, dissolving the rubber continuously, and, after removing the undissolved rubber, feeding the resulting dissolved rubber solution to the reactor.

In the present invention, the term "rubber" means natural rubber or synthetic rubber, and examples of synthetic rubber are a polybutadiene, a high cis-polybutadiene rubber, middle cis-polybutadiene rubber, a low cis-polybutadiene rubber, an isoprene rubber, a chloroprene rubber, a poly-2-chlorobutadiene rubber, a polycyclopentadiene rubber, an ethylene-propylene rubber, an ethylene-propylene-diene rubber, an isobutyrene-isopropylene rubber, an acrylonitrile-butadiene rubber, an acrylonitrile-isoprene rubber, a styrene-butadiene rubber, a styrene-isoprene rubber, a styrene-chloroprene rubber, a butadiene-isoprene rubber, a butadiene-chloroprene rubber, chloroprene-isoprene rubber, a styrene-(butadiene-isoprene) rubber, a 2-chloro-1-chlorobutadiene rubber, a chlorosulfonated polyethylene rubber, an ethylene-vinyl acetate rubber, other various acrylic rubbers, an organosilicon compound rubber, a urethane rubber, or an ether rubber, or a mixture thereof.

The "monomer capable of reacting with a rubber" includes a styrene; an α-alkyl-substituted styrene, such as α-methylstyrene, α-ethylstyrene, and α-methyl-p-methylstyrene; an alkyl-substituted styrene, such as o-methylstyrene, p-methylstyrene, m-methylstyrene, ethylstyrene, 2,4-dimethylstyrene, o-t-butylstyrene, and p-t-butylstyrene; a halogenated styrene, such as o-chlorostyrene, m-chlorostyrene, p-chlorostyrene, dichlorostyrene, dibromostyrene, trichlorostyrene, tribromostyrene, tetrachlorostyrene, and 2-methyl-4-chlorostyrene; a vinylidene aromatic compound, such as p-hydroxystyrene, o-methoxystyrene, vinylnapthalene, and vinylanthracene; an unsaturated nitrile, such as acrylonitrile, methacrylontrile, fumaronitrile, and α-chloronitrile; an alkyl acrylate, such as methyl acrylate, n-butyl acrylate, methyl metacrylate, and methyl methacrylate; an unsaturated dicarboxylic acid anhydride, such as maleic anhydride, succinic anhydride, oxymaleic anhydride, itaconic anhydride, oxyitaconic anhydride, citraconic anhydride, phenylmaleic anhydride, anicotic anhydride, ethylmaleic anhydride, and chloromaleic anhydride; a maleimide, such as maleimide and N-phenylmaleimide; or an unsaturated monocarboxylic acid, such as methacrylic acid and acrylic acid; or a mixture thereof.

The "solvent" to be used is not particularly limited, but includes an aromatic hydrocarbon; such as benzene, toluene, ethylbenzene, and xylene; an inert substituted aromatic hydrocarbon, a straight-chain saturated aliphatic hydrocarbon, such as heptane, hexane, and octane; a branched saturated aliphatic hydrocarbon; an inert substituted saturated aliphatic hydrocarbon; a cycloaliphatic hydrocarbon, such as cyclohexane, or an inert substituted cycloaliphatic hydrocarbon, or a mixture thereof.

Figure 2:
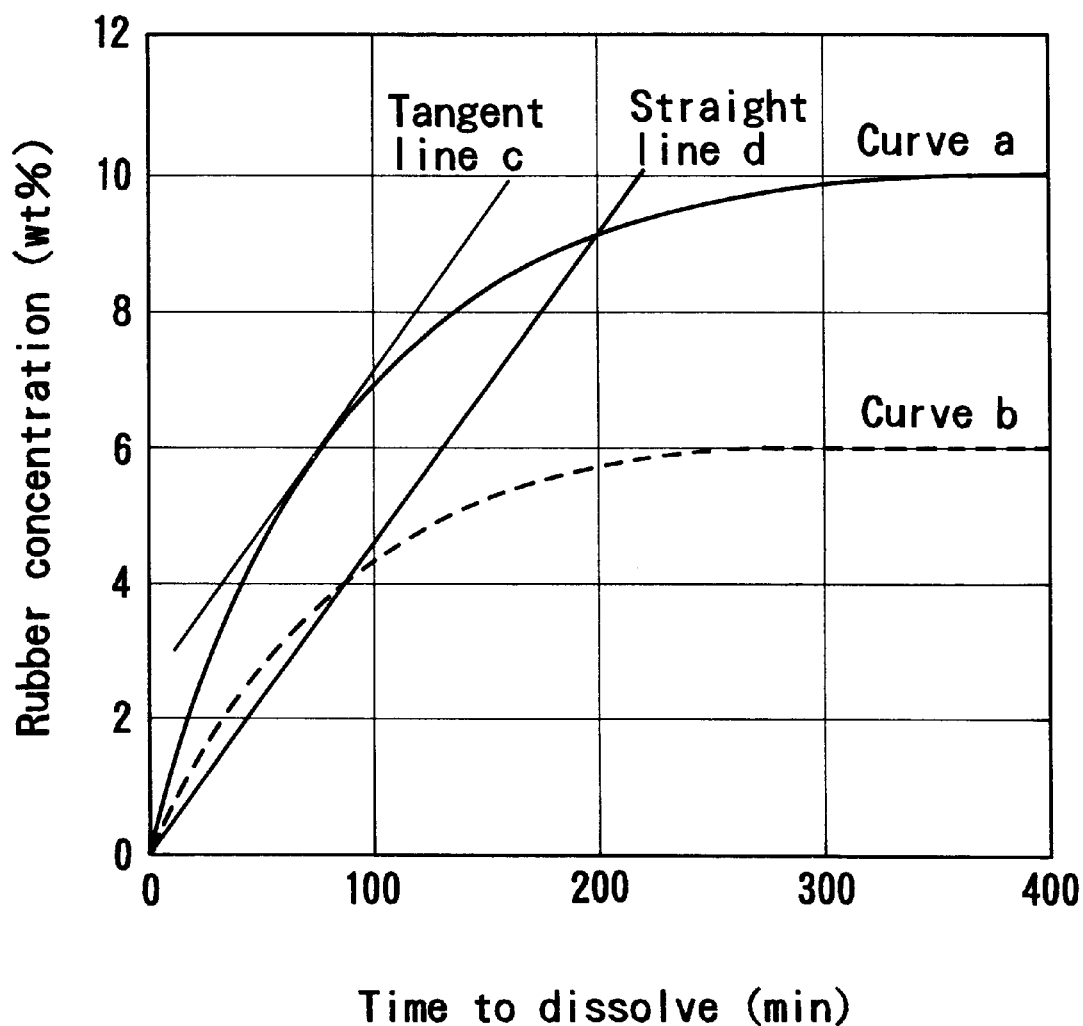
FIG. 2 is a graph illustrating the relationship between the dissolution time of a rubber and the concentration of the rubber in the rubber solution.

The curves a and b in FIG. 2 show, concerning rubber solutions of different rubber concentrations, the concept of relationship between dissolution time and rubber concentration.

The curves a and b show the relationship where a rubber and a monomer are charged in a dissolution bath so that, when the rubber is dissolved completely, the concentration of the rubber solution reaches, in the case of the curve a, 10 wt %, and, in the case of the curve b, 6 wt %, respectively.

Concerning the curve b, as the rubber concentration approaches 6 wt %, the dissolved rubber concentration becomes higher. As the result, the amount of the undissolved rubber decreases, and thus the dissolution rate is gradually delayed, becoming 0 at 6 wt %. As a result, the dissolution time needed turns out to be extremely longer, attaining about 260 minutes.

In the case of the curve a, since the undissolved rubber exists even when the concentration reaches 6 wt %, the dissolution rate turns out to be as indicated in a tangent line c. It is the concept of a continuous dissolution that, so as to maintain the dissolution rate, the operation is performed by allowing the undissolved rubber to exist.

When the continuous operation is performed at this dissolution rate, the relation between the rubber concentration and a residence time of the rubber solution has been found to be a straight line d, which is parallel to the tangent line c and passes through the point of the origin. Accordingly, about 130 minutes of the residence time becomes needed in order to obtain the concentration of 6 wt %, which means that the volume of the dissolution bath may be about one half of that needed in the conventional method.

As is indicated in curves a, and b, as the amount of the undissolved rubber increases, the dissolution rate becomes higher and an inclination of the tangent line c increases. This shortens the residence time of the rubber solution, thus allowing the dissolution tank to be smaller enough. Also, the dissolution rate can be made higher by raising the temperature at which the rubber is dissolved, thus making it possible to downsize the dissolution bath.

As described above, in the present invention, the dissolution tank can be made smaller than that used in the conventional method, and in addition, the rubber concentration in the dissolution tank can be varied continuously in a short time. In this first embodiment, residence time of the rubber solution in the dissolution tank is generally, 0.1 to 6 hours, and preferably 0.5 to 4 hours.

Now the first embodiment of the present invention is described by reference to FIG. 1. Referring to FIG. 1, a dissolution tank 1 is shown, which is provided with a stirring function, like a stirrer or the like. To the dissolution tank 1, a rubber 5 is continuously fed through a line 11, a monomer 6 is fed through a line 9, and a solvent 7 is fed through the line 9 and a line 10. Additionally stated, the rubber and monomer may consist of two or more types of those, respectively, and the solvent 7 is optional. Generally, the solvent amounts to 50% by weight or less of the total of the monomer, the rubber, and the solvent. Parenthetically, the rubber 5 is fed to the dissolution tank 1 generally in the form of 0.5-cm to 5-cm chips. To adjust pieces of the rubber to a desired size, the rubber may be cut, for example, with a cutter to a prescribed size, or a means for grinding or the like may be used. Alternatively, rubber granules previously prepared may be used.

Since the rubber 5 is charged in the dissolution tank 1 in a quantity exceeding the quantity that corresponds to the concentration of the rubber to be fed to a reactor 4, the undissolved rubber 8 remains. Although, it may vary depending on liquid volume in dissolution tank, the concentration of the rubber to be fed to the reactor 4 and the dissolution temperature of the dissolution tank 1, the quantity of the undissolved rubber 8 is selected to be at most a quantity that prevents the chips of the undissolved rubber from sticking to one another to form larger rubber masses, and preferably it is determined to be one selected from 0.1 to 3.0 times by weight, more preferably 0.1 to 1.0 times by weight the quantity of the dissolved rubber present in the dissolution tank 1.

If the quantity is less than 0.1 times by weight, in some cases, it fails to attain a desired dissolution rate enough to make the dissolution tank extremely small. On the other hand if the quantity is over 3.0 times by weight, the increased quantity of the undissolved rubber 8 causes the chips of the undissolved rubber to stick to one another in the dissolution tank 1 disadvantageously to readily form larger rubber masses, but the dissolution rate does not rise so much despite the increase of the undissolved rubber; which is unpreferable.

The operating temperature in the dissolution tank 1 is chosen to be lower than the polymerization temperature in the reactor to which the monomer is fed, and lower than the boiling point of the solvent. Temperatures higher than the polymerization temperature or the boiling point of the solvent are not recommended, for the sake of safety.

The undissolved rubber is separated by a filter 2, and the resulting liquid is fed through a line 12, a pump 3, and a line 13, to the reactor 4. The filter 2 serves to separate undissolved rubber and the size of the mesh thereof is generally 20 mm or less, and preferably 1.0 to 20.0 mm.

The object of the present invention is also attained by a second embodiment, that is, a method for continuously dissolving a rubber, by supplying pieces of a rubber, of which the size has been adjusted to a desired size, to a dissolution tank provided with a dissolution means, such as a stirrer, therein, where the rubber is dissolved in the presence of a monomer or both a monomer and a solvent, which comprises feeding the rubber to the dissolution tank continuously and dissolving the rubber continuously separating the undissolved rubber and rubber solution that passes through the separator having a number of holes of which diameter is in the range of 1.0 to 20,.0 mm.

The separator having a number of holes used in this mode may be in the shape of a hollow cylinder or prism, for example. The separator having a number of holes is provided in and/or outside the dissolution tank.

The hole diameter is preferably 1.0 mm or more because of easy processing of the holes and economical advantages. If the hole diameter is too large, when the undissolved rubber passed through the holes is supplied to a reactor such as a polymerization vessel in the next step, a filtering apparatus for removing impurities from the raw material or a supply pipe in the next step is clogged. Further, if large pieces of undissolved rubber are supplied to the polymerization vessel, the polymerization reaction is hindered, which is unpreferable.

If the separator is provided only in the dissolution tank, the diameter of the holes of the separator is usually in the range of 1.0 to 20.0 mm while if such separators are provided both in and outside the dissolution tank, it is recommended that the diameter of the holes of the separator provided in the dissolution tank is made larger than the diameter of the holes of the case wherein the separator is provided only in the dissolution tank, so that undissolved rubber and the rubber solution passed through the holes are separated to be supplied to the separator provided outside the dissolution tank. The diameter of the holes of the separator provided outside the dissolution tank is preferably in the range of 1.0 to 20.0 mm. If the separator is provided only outside the dissolution tank, the diameter of the holes is preferably in the range of 1.0 to 20.0 mm and more preferably 1.0 to 10.0 mm.

In this embodiment, the interval of the holes (i.e. distance between the center of holes) varies depending on a method of boring holes, surface area of the separator, diameter of the holes, number of holes, etc. and is usually 1.2 times or more, preferably 1.5 to 5.0 times to the diameter of the holes.

In this embodiment, the residence time of the rubber solution in the dissolution tank is usually 0.1 to 6 hours, and preferably 0.5 to 4 hours.

Next, this second embodiment is described in detail with reference to FIGS. 3 and 4.

Figure 3:
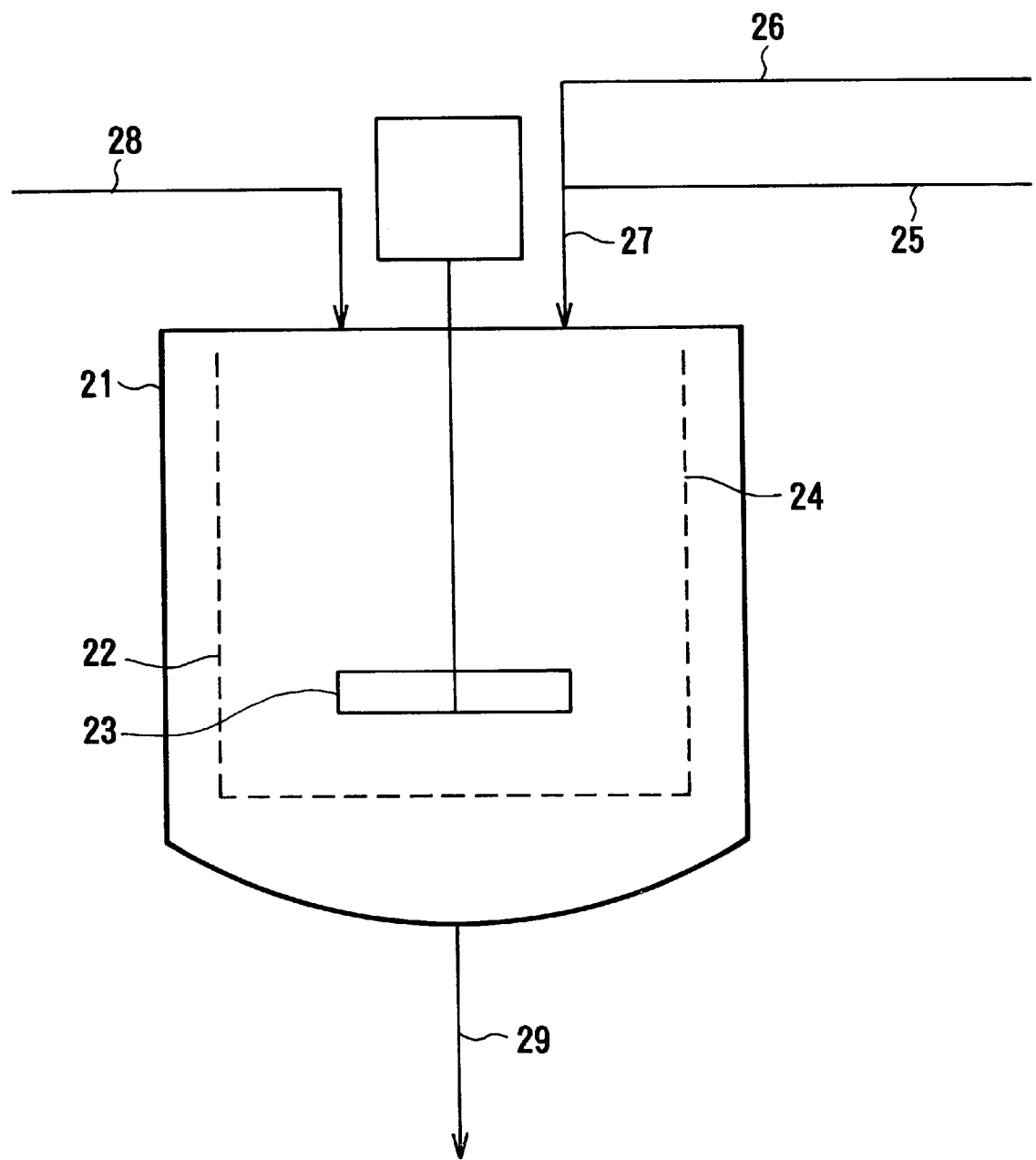
FIG. 3 is an illustrative diagram showing another embodiment of the present invention.

FIG. 3 is an illustrative diagram of an example of the dissolution tank used in this embodiment, wherein a cylindrical separator having a number of holes on the wall is provided only in the dissolution tank.

In this example, the dissolution of rubber and the separation of undissolved rubber are carried out in the same dissolution tank and the dissolution tank 21 has therein a separator 22 composed of a cylinder having a wall with a number of holes and a stirrer 23. The separator 22 is provided with a number of holes having a diameter of 1.0 to 20.0 mm.

A prescribed amount of a solvent is supplied through a line 25, a prescribed amount of a monomer is supplied through a line 26 and they are supplied continuously through the line 27 into the separator 22.

A prescribed amount of pieces of a raw material rubber which have been adjusted in size to about 0.5-mm cubes to 50-mm cubes is supplied continuously to the separator 22 from a line 28. By way of parenthesis, there are a case wherein two or more rubbers and two or more monomers are used and a case wherein no solvent is used. If a solvent is used, generally the amount of the solvent is 50% by weight or less based on the total amount of the monomer, the rubber, and the solvent.

In the dissolution tank 21, the stirrer 23 is rotated to stir the solvent, the monomer, and the rubber to dissolve the rubber in the monomer and the solvent.

Pieces of the rubber are swelled and dissolved, and the rubber swelled are gradually reduced in size until the shapes almost disappear and its rubber concentration becomes near to that of the dissolved rubber solution, and then the rubber passes through the holes 24 formed in the wall and the bottom of the separator 22, is taken out from the bottom of the dissolution tank 21 together with the rubber solution whose concentration has reached a prescribed value, and is supplied through a line 29 to a reactor (polymerization vessel) in the next step. The undissolved rubber pieces that cannot pass through the holes 24 remain in the separator 22 until they are further dissolved so that they can pass through the hole 24.

Although revolving flows of the rubber solution and the undissolved rubber are generated in the separator 22 of the dissolution tank 21 by the stirrer 23, by bringing the average flow velocity of the rubber solution around the wall holes 24 of the separator 22 to the range of 0.01 to 10.0 m/sec the holes 24 can be prevented from being clogged with the undissolved rubber. Further, it is preferable to employ this average flow velocity of the rubber solution, to keep the undissolved rubber that has smaller diameter size than the diameter of holes 24, from passing the hole as much as possible. If this average flow velocity is too small, the possibility that the holes 24 are clogged with the undissolved rubber is increased. On the other hand, if the average flow velocity is too large, a large stirring drive force is required, which is uneconomical in view of energy cost. The flow velocity may be measured by the generally used flow measurement method, such as the particle tracing method and the measurement may be made at a point 5 mm away from the holes 24 of the separator 22 on the side of the flow of the rubber solution (on the side near to the center of the separator 22), where the average flow linear velocity is measured.

Further, the average flow velocity of the undissolved rubber and the rubber solution passing through the wall from the inside of the holes in the separator 22 to the outside thereof is determined depending on the discharging velocity of the rubber solution from dissolving tank, and it is preferably 0.001 to 0.1 m/sec. If that average flow velocity is too small, more holes are required to be provided, which is not preferable. On the other hand, if that average low velocity is too large, a state wherein the undissolved rubber will clog the holes 24 is generated and the possibility of the clogging of the holes 24 is increased.

In the method of the present invention as is known in the art, the rubber is dissolved and swelled with a lapse of time, to have the almost same concentration of swelled rubber to the rubber solution around. Therefore, in the rubber solution which includes small pieces of undissolved rubber that passed the holes of separator, the concentration distribution of the rubber solution immediately and easily becomes uniform during transfer to the next step.

The amounts of the monomer, the solvent, and the rubber that are continuously supplied into the separator 22 are controlled so as to correspond to the concentrations of the monomer, the solvent, and the rubber that are supplied into a polymerization tank in the next step. The rubber concentration can be stabilized, by virtue of its self-controlling property, by discharging the rubber solution so that the solution volume in the dissolution tank are kept at a constant value. For example, when the temperature in the separator rises, although the rubber concentration of the rubber solution temporarily taken out from the separator rises as the dissolution rate increases, the quantity of the undissolved rubber in the dissolution tank decreases. As a result, the dissolution rate is retarded, becoming equal to the value before the rise in the temperature. When the temperature gets lower and the rubber dissolution rate is retarded, the amount of the undissolved rubber increases. As a result, the dissolution rate is accelerated, turning out to be the value before the down of the temperature. It is needless to say that, in the present invention, the rubber concentration can be stabilized even further by making the temperature in the dissolution tank as constant as possible.

In this embodiment of this invention, a method to start the operation is as follows. The rubber solution in the dissolution tank is dissolved in advance in a batch system so that the concentration thereof becomes equal to be an intended rubber solution concentration, and then the quantities, which correspond to the concentrations of the monomer, the solvent, and the rubber that are to be supplied into the polymerization tank in the next step, are supplied into the dissolution bath, and finally the quantities supplied into the polymerization bath in the next step are discharged. Then, at the begging of the operation, the rubber solution concentration and the undissolved rubber quantity change unsteadily. However, along with the continuation of the operation, the amount of the undissolved rubber in the dissolution tank becomes in a steady state and the rubber concentration of the rubber solution becomes constant reaching a level of intended rubber concentration. Further, at the start of the operation, such steady state can also be attained in a shorter period of time, by increasing the speed of feeding of rubber. At that time, in the same way as in the first embodiment, undissolved rubber is retained to coexist with the rubber in an amount 0.1 to 3.0 times by weight the amount of the dissolved rubber which corresponds to rubber concentration of the rubber solution to be supplied to the polymerization vessel in the next step.

If the quantity is less than 0.1 times by weight, in some cases, it fails to attain a desired dissolution rate enough to make the dissolution tank extremely small. On the other hand, if the quantity is over 3.0 times by weight, the increased quantity of the undissolved rubber 8 causes the chips of the undissolved rubber to stick to one another in the dissolution tank 1 disadvantageously to readily form larger rubber masses, but dissolution rate does not rise so much despite the increase of the undissolved rubber.

Though not shown in the figures, if separators are provided both in and outside the dissolution tank, the diameter of the holes of the separator provided in the dissolution tank is made larger than the diameter of the holes in the case wherein the separator is provided only in the dissolution tank, whereby the undissolved rubber and the rubber solution are separated.

Then, the undissolved rubber and the rubber solution are taken out from the bottom of the dissolution tank and are supplied into a separator of a double pipe by using a pump, which separator has a number of holes therein. The diameter of the holes of this separator is to be in the range of 1.0 to 20.0 mm and the undissolved rubber is separated from a separation means to be circulated to the dissolution tank, where it is dissolved further in the monomer and the solvent. The undissolved rubber and the rubber solution passed through the holes are supplied to the polymerization vessel in the next step.

Further, in this second embodiment, the separator may be provided outside the dissolution tank and the rubber solution may be circulated to the outside separator to be returned to the dissolution tank. FIG. 4 is an illustrative diagram showing an example of such a dissolution apparatus, wherein a cylindrical separator having a number of holes is provided only outside the dissolution tank. In FIG. 4, the same numerals refer to the same things as in FIG. 3.

The rubber is dissolved in a dissolution tank 21 and the undissolved rubber is separated in a separator 32 that is provided in a double pipe 35 positioned outside the dissolution tank 21. The separator 32 is formed with a number of holes 34 having a diameter of 1.0 to 20.0 mm.

A prescribed amount of a solvent is supplied from a line 25, a prescribed amount of a monomer is supplied from a line 26, then they are supplied continuously through a line 27 into a dissolution tank 21, and a prescribed amount of a rubber is supplied from a line 28 into the dissolution tank 21.

In the dissolution tank 21, a stirrer 23 is rotated to mix the solvent, the monomer, and the rubber to dissolve the rubber in the monomer and the solvent. The pieces of the rubber are swollen and dissolved with the size reduced gradually.

Then, the undissolved rubber and the rubber solution are taken out from the bottom of the dissolution tank 21 into a line 33 and is supplied into the separator 32 of the double pipe 35 from a line 36 by a pump 37. The undissolved rubber is separated in the separator 32 and is returned through a line 38 into the dissolution tank 21, where the undissolved rubber is further dissolved in the monomer and the solvent. On the other hand, the rubber solution containing the undissolved rubber passed through the holes are supplied through a line 39 to a polymerization tank in the next step. As described above the concentration distribution of the rubber solution immediately and easily becomes uniform by the dissolution of the undissolved rubber to the rubber solution during its transfer after discharging.

According to the present method for dissolving a rubber continuously, the following excellent effects can be exhibited:

(1) The residence time required to attain a prescribed rubber concentration of the rubber solution can be shortened, and the size of a dissolution tank can be made smaller, compared with the conventional methods.

(2) Further, as a result, the rubber concentration of a product can be varied continuously in a short period of time.

EXAMPLES

Now, the present invention is described in more detail by reference to Examples, but they are not meant to limit the invention to them.

Example 1

A experiment was carried out based on the flow sheet shown in FIG. 1. The dissolution tank 1 was a tank having an operation capacity of 217 liters, and it was equipped with a stirrer 14 and a 40-mesh (Tyler) filter 2. A liquid containing The operation conditions and the results are shown in Table 1.

TABLE 1

|  |  | Example 1 | Example 2 | Example 3 | Comparative Example 1 |
| --- | --- | --- | --- | --- | --- |
| Prescribed rubber conentration | wt. % | 6 | 6 | 10 | at most 6 |
| Operation capacity of dissolution tank | l | 217 | 54 | 217 | 27 |
| Dissolution temperature | ° C. | 30 | 30 | 30 | 30 |
| Average dissolution time | Hr | 2 | 0.5 | 2 | 0.25 |
| Type of rubber |  | Polybutadiene | Polybutadiene | Polybutadiene | Polybutadiene |
| Quantity of charged rubber | kg/hr | 6 | 6 | 10 | 6 |
| Type of monomer |  | Styrene | Styrene | Styrene | Styrene |
| Quantity of charged monomer | kg/hr | 82 | 82 | 78 | 82 |
| Type of solvent |  | Ethylbenzene | Ethylbenzene | Ethylbenzene | Ethylbenzene |
| Quantity of charged solvent | kg/hr | 12 | 12 | 12 | 12 |
| Quantity of dissolved rubber in dissolution tank | kg | 12 | 3 | 20 | 1.5 |
| Quantity of undissolved rubber in dissolution tank | kg | 6.7 | 7.4 | 15.4 | 5 or more |
| Quantity of rubber in dissolution tank (undissolved/dissolved) |  | 0.56 | 2.48 | 0.77 | 3.33 or more; the rubber reagglomerated to make continuous operation impossible |

6% by weight of a rubber was continuously fed to the reactor 4 (polymerization tank).

To the dissolution tank 1 were fed styrene, as the monomer 6, in a quantity of 82 kg/hr, ethylbenzene, as the solvent 7, in a quantity of 12 kg/hr, and 10-mm chips of polybutadiene, as the rubber 6, in a quantity of 6 kg/hr. The temperature in the dissolution tank 1 was adjusted to 30° C. The 6-wt. % dissolved rubber solution was taken out by the pump 3 at a rate of 100 kg/hr, and it was fed to the reactor 4, so that the average dissolution time might be 2 hours. At that time, the quantity of the dissolved rubber in the dissolution tank was 12 kg, and the quantity of the undissolved rubber was 6.7 kg. The results are shown in Table 1.

Example 2

Example 1 was repeated, except that the operation capacity of the dissolution tank was changed from 217 liters to 54 liters, and the dissolution time was changed from 2 hours to 0.5 hours. The results are also shown in Table 1.

Comparative Example 1

Example 1 was repeated, except that the operation capacity of the dissolution tank was changed from 217 liters to 27 liters, and the dissolution time was changed from 2 hours to 0.25 hours. The results showed that the chips of the rubber stuck to one another to form larger masses, that the rubber concentration of 6% by weight could not be attained, and that it was impossible to operate continuously.

Example 3

Example 1 was repeated under uniform condition of 217 liters of operation capacity of the dissolution tank and 2 hours of dissolution times, except that the rubber concentration was changed from 6% by weight to 10% by weight.

Example 4

Using the dissolution tank 21 as shown in FIG. 3 instead of dissolution tank 1 in FIG. 1 in Example 1, this Example was carried out by providing a cylindrical separator only in the dissolution tank.

The dissolution tank 21 had a diameter of 215 mm, the liquid capacity was 7500 g in terms of weight, the separator 22 had a diameter of 190 mm, the diameter of the holes in the wall of the separator was 2.5 mm, and a stirrer 23 had an impeller having a blade diameter of 100 mm that was rotated at 300 rpm to dissolve 5-mm rubber cubes. The temperature in the dissolution tank 21 was adjusted to 30° C.

The rubber solution to be supplied to the polymerization tank in the next step was prepared by dissolving continuously a rubber so that rubber solution which had a styrene concentration of 85% by weight, an ethylbenzene concentration of 8.0% by weight, and a rubber concentration of 7.0% by weight in the presence of undissolved rubber might be produced. The undissolved rubber was 3.0% by weight. The operating conditions are shown in Table 2.

The average flow linear velocity at the position 5 mm away from the holes 24 in the separator 23 on the flow side of the undissolved rubber and the rubber solution was measured as 0.01 m/sec. The residence time of the rubber in the dissolution tank 21 was set to be 2.0 hours.

As a result of the continuous operation for 72 hours, the operation could be made favorably continuously without clogging with undissolved rubber or forming masses of the rubber.

Example 5

Figure 4:
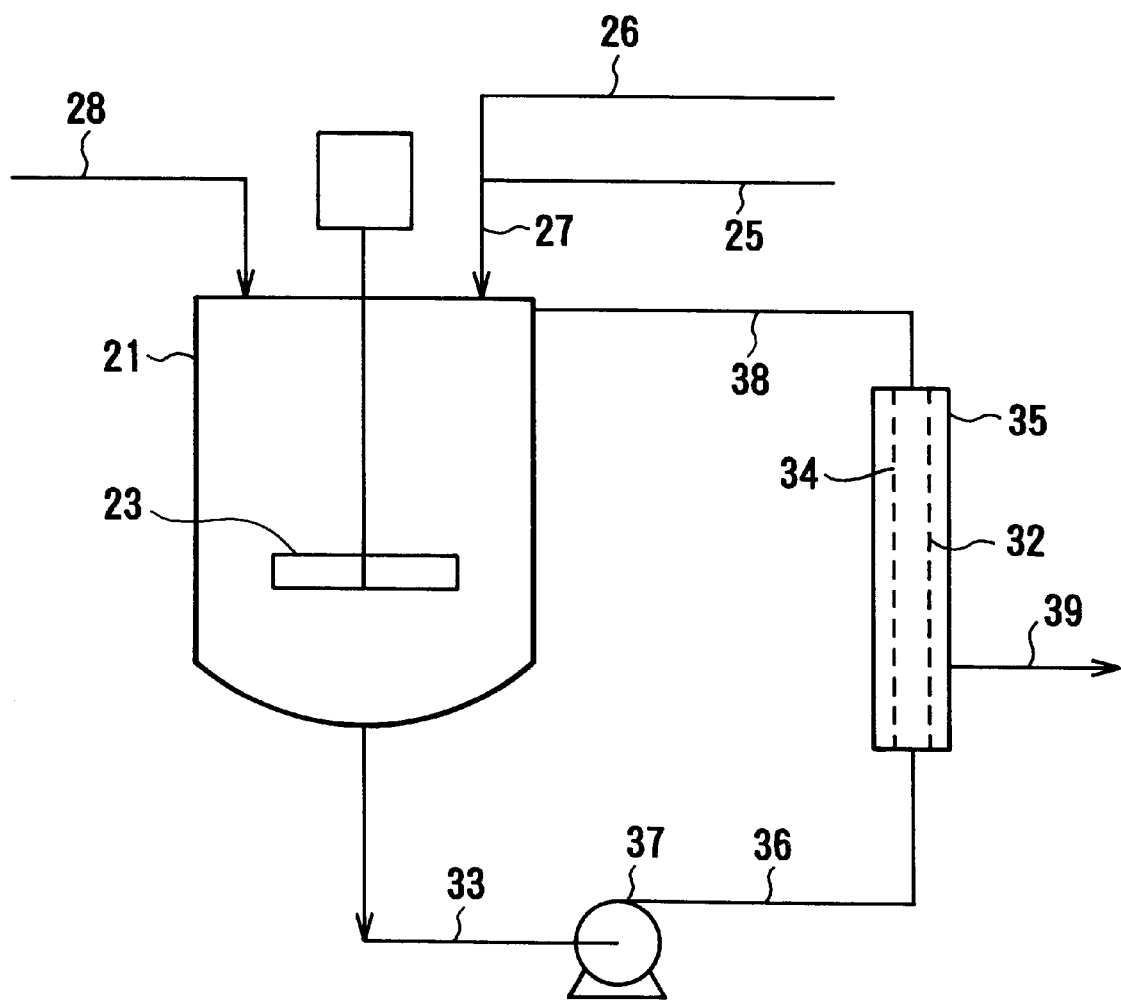
FIG. 4 is an illustrative diagram of a modification of the embodiment of FIG. 3.

This Example was carried out by using a dissolution apparatus wherein the cylindrical separator shown in FIG. 4 was provided only outside a dissolution tank.

The dissolution tank 21 had a diameter of 215 mm, the liquid capacity was 7500 g in terms of weight, the separator 32 provided in the double pipe 35 had a diameter of 70 mm, and a stirrer 23 had an impeller having a blade diameter of 100 mm which was rotated at 300 rpm.

The composition of the rubber solution to be supplied to the polymerization tank in the next step was made to have the same composition as that of Example 4 and the residence time of the rubber in the dissolution tank, the diameter of the holes formed in the separator 32, and the average flow linear velocity in the separator were made the same as those in Example 4. The temperature in the dissolution apparatus was adjusted to 30° C. The operating conditions are shown in Table 2.

As a result of the continuous operation for 72 hours, the operation could be made favorably continuously without clogging with undissolved rubber or forming masses of the rubber.

Comparative Example 2

Continuous dissolution of rubber was carried out in the same manner as in Example 4, except that the cylindrical separator was changed as follows.

The diameter of holes formed in the separator was 25 mm. The operating conditions are shown in Table 2.

The composition of the rubber solution to be supplied to the polymerization tank in the next step was made to have the same composition as that of Example 4. As a result of the continuous operation for 72 hours, about 2% of undissolved rubber pieces having a diameter of about 3 to 5 mm were supplied to the next step. As a result, clogging was occurred in the supplying line to the next step.

Comparative Example 3

Dissolution of rubber was carried out by using the dissolution tank in a conventional batch-wise manner. The tank used had the same diameter, and blade diameter of a stirrer as those of Example 5. The capacity of tank, the composition of the rubber solution to be supplied to the next step and the rotating speed of the stirrer were set to have the same ones as in Example 5. The temperature in the dissolution tank was set to 30° C. Then the rubber, the monomer, and the solvent in the below shown amounts were supplied at a time to the dissolution tank and time to dissolve the rubber was measured. It took 6 hours for the rubber to be dissolved.

The size of the rubber piece: 5-mm cubes

The supply of the rubber: 528 g

The supply of the monomer: 6360 g

The supply of the solvent: 600 g

TABLE 2

|  | Example 4 | Example 5 | Comparative Example 2 |
|---|---|---|---|
| Size of the rubber pieces (–mm cubes) | 5 | 5 | 5 |
| Supply of the rubber (g/min) | 4.4 | 4.4 | 4.4 |
| Supply of the monomer (g/min) | 53 | 53 | 53 |
| Supply of the solvent (g/min) | 5.0 | 5.0 | 5.0 |
| Diameter of the separator (mm) | 190 | — | 190 |
| diameter of the separator of the double pipe (mm) | — | 70.0 | — |
| Diameter of the holes (mm) | 2.5 | 2.5 | 25.0 |
| Velocity of the flow passing through the holes (m/sec) | 0.005 | 0.005 | 0.005 |
| Interval between the holes/diameter of holes | 2.0 | 2.0 | 2.0 |

What we claim is:

1. A method of dissolving a rubber continuously to form a raw material supplied continuously from a dissolution tank into a reactor for the production of rubber-modified polymer, by dissolving a rubber in a monomer liquid dissolving the rubber and capable of reacting with the rubber in the presence or absence of a solvent, which comprises feeding pieces of rubber to the dissolution tank continuously to allow the dissolved rubber and the undissolved rubber to coexist in the dissolution tank, wherein the concentration of the dissolved rubber is the concentration at which the feeding to the reactor is made, and the quantity of the undissolved rubber present in the dissolution tank is at most the quantity that prevents pieces of the undissolved rubber from sticking to one another to form larger rubber masses, dissolving the rubber continuously and, after removing the undissolved rubber, feeding the resulting dissolved rubber solution to the reactor.

2. The method of dissolving a rubber continuously as claimed in claim 1, wherein the amount of undissolved rubber in said dissolution tank is 0.1 times or more, but 3 times or less by weight of the amount of dissolved rubber in the rubber solution to be supplied to the reactor.

3. A method of continuously dissolving a rubber by supplying pieces of rubber to a dissolution tank provided with a dissolution means, where the rubber is dissolved in the presence of a monomer or both a monomer and a solvent, which comprises feeding the rubber to the dissolution tank continuously and dissolving the rubber continuously while conducting the separation of the undissolved rubber and rubber solution that passes through a separator having a number of holes of which diameter is in the range of 1.0 to 20.0 mm.

4. The method for continuously dissolving a rubber as claimed in claim 3, wherein the amount of undissolved rubber in said dissolution tank is 0.1 times or more, but 3 times or less by weight of the amount of dissolved rubber in the rubber solution to be supplied to the reactor.

5. The method for continuously dissolving a rubber as claimed in claim 3, wherein a separator having a number of holes is provided in and/or outside the dissolution tank.

* * * * *